United States Patent
Sakai

(10) Patent No.: US 9,143,925 B2
(45) Date of Patent: Sep. 22, 2015

(54) COMMUNICATION PARAMETER SETTING APPARATUS AND CONTROL METHOD THEREFORE

(75) Inventor: Tatsuhiko Sakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 524 days.

(21) Appl. No.: 12/808,347

(22) PCT Filed: Jan. 6, 2009

(86) PCT No.: PCT/JP2009/050260
§ 371 (c)(1),
(2), (4) Date: Jun. 15, 2010

(87) PCT Pub. No.: WO2009/090924
PCT Pub. Date: Jul. 23, 2009

(65) Prior Publication Data
US 2010/0290447 A1    Nov. 18, 2010

(30) Foreign Application Priority Data

Jan. 15, 2008  (JP) .................................. 2008-005811

(51) Int. Cl.
H04W 12/06      (2009.01)
H04W 84/12      (2009.01)
H04L 29/08      (2006.01)
(Continued)

(52) U.S. Cl.
CPC ............. *H04W 8/24* (2013.01); *H04L 41/0843* (2013.01); *H04L 63/08* (2013.01); *H04W 12/06* (2013.01); *H04L 67/34* (2013.01); *H04W 84/12* (2013.01)

(58) Field of Classification Search
CPC ..... H04W 12/06; H04W 12/08; H04W 84/12; H04L 67/34
See application file for complete search history.

(56) References Cited

U.S. PATENT DOCUMENTS 6,212,570 B1    4/2001   Hasebe et al.
7,126,951 B2 *  10/2006  Belcea et al. ................. 370/400
(Continued)

FOREIGN PATENT DOCUMENTS

CN      1515124     7/2004
CN      1578229 A   2/2005
(Continued)

OTHER PUBLICATIONS

Wi-Fi Certified for Wi-Fi Protected Setup: Easing the User Experience for Home and Small Office Wi-Fi® Networks, 2009, pages 14.
(Continued)

*Primary Examiner* — Jianye Wu
(74) *Attorney, Agent, or Firm* — Fitzpatrick, Cella, Harper & Scinto

(57) ABSTRACT

A communication apparatus in which it is determined whether a communication parameter setting scheme used to provide a partner apparatus with communication parameters is an authentication code scheme or a non-authentication code scheme. Any one of first communication parameters to wirelessly communicate in a first wireless network and second communication parameters to wirelessly communicate in a second wireless network are selected in accordance with the determined setting scheme. The partner apparatus is provided with the selected communication parameters in accordance with the determined setting scheme.

8 Claims, 9 Drawing Sheets

(51) Int. Cl.
  *H04W 8/24* (2009.01)
  *H04L 12/24* (2006.01)
  *H04L 29/06* (2006.01)

(56) References Cited

U.S. PATENT DOCUMENTS

| | | | |
|---|---|---|---|
| 7,293,071 B2 | 11/2007 | Sato et al. | 709/217 |
| 7,623,666 B2 | 11/2009 | Motoyoshi et al. | 380/270 |
| 7,653,037 B2 * | 1/2010 | Prakash et al. | 370/338 |
| 7,697,932 B2 * | 4/2010 | Nakajima | 455/435.1 |
| 7,735,130 B2 | 6/2010 | Sato et al. | 726/17 |
| 7,742,742 B2 | 6/2010 | Watanabe et al. | |
| 7,831,246 B1 | 11/2010 | Smith et al. | |
| 7,929,967 B2 | 4/2011 | Buckley et al. | |
| 8,045,530 B2 * | 10/2011 | Haverinen et al. | 370/338 |
| 2004/0047341 A1 | 3/2004 | Staack et al. | |
| 2004/0098471 A1 | 5/2004 | Shima | 709/221 |
| 2005/0028011 A1 | 2/2005 | Motoyoshi et al. | |
| 2006/0123053 A1 | 6/2006 | Scannell, Jr. | |
| 2006/0185001 A1 | 8/2006 | Stieglitz et al. | |
| 2006/0277407 A1 | 12/2006 | Matsuki | |
| 2007/0076879 A1 * | 4/2007 | Asokan et al. | 380/255 |
| 2008/0026795 A1 | 1/2008 | Fujii | |
| 2009/0007226 A1 | 1/2009 | Fujii | |
| 2009/0024702 A1 | 1/2009 | Schweier | |
| 2009/0046686 A1 * | 2/2009 | Izaki | 370/338 |
| 2010/0100847 A1 | 4/2010 | Sato et al. | 715/810 |

FOREIGN PATENT DOCUMENTS

| | | |
|---|---|---|
| CN | 1656458 A | 8/2005 |
| EP | 1 389 851 A1 | 2/2004 |
| EP | 1 501 016 A1 | 1/2005 |
| JP | 2004-78392 | 3/2004 |
| JP | 2005-51458 | 2/2005 |
| JP | 2006-311137 A | 11/2006 |
| JP | 2007-143117 | 6/2007 |
| JP | 2007-258823 A | 10/2007 |
| WO | 02/51188 A1 | 6/2002 |
| WO | 03/100620 | 12/2003 |
| WO | 2007090560 | 8/2007 |
| WO | 2007/110090 A1 | 10/2007 |
| WO | 2006/098552 A1 | 9/2010 |

OTHER PUBLICATIONS

U.S. Appl. No. 12/599,973, filed Nov. 12, 2009, Applicant(s): Tatsuhiko Sakai.
U.S. Appl. No. 12/666,277, filed Dec. 22, 2009, Applicant(s): Tatsuhiko Sakai.
U.S. Appl. No. 12/808,348, filed Jun. 15, 2010, Applicant(s): Tatsuhiko Sakai.
U.S. Appl. No. 12/811,376, filed Jun. 30, 2010, Applicant(s): Tatsuhiko Sakai.
Chinese Office Action dated Aug. 20, 2012 from related Chinese Patent Appln No. 2009-80102015.6, with English Translation.
Chinese Office Action dated Nov. 1, 2012, in corresponding Chinese Patent Application No. 200980102014.1.

* cited by examiner

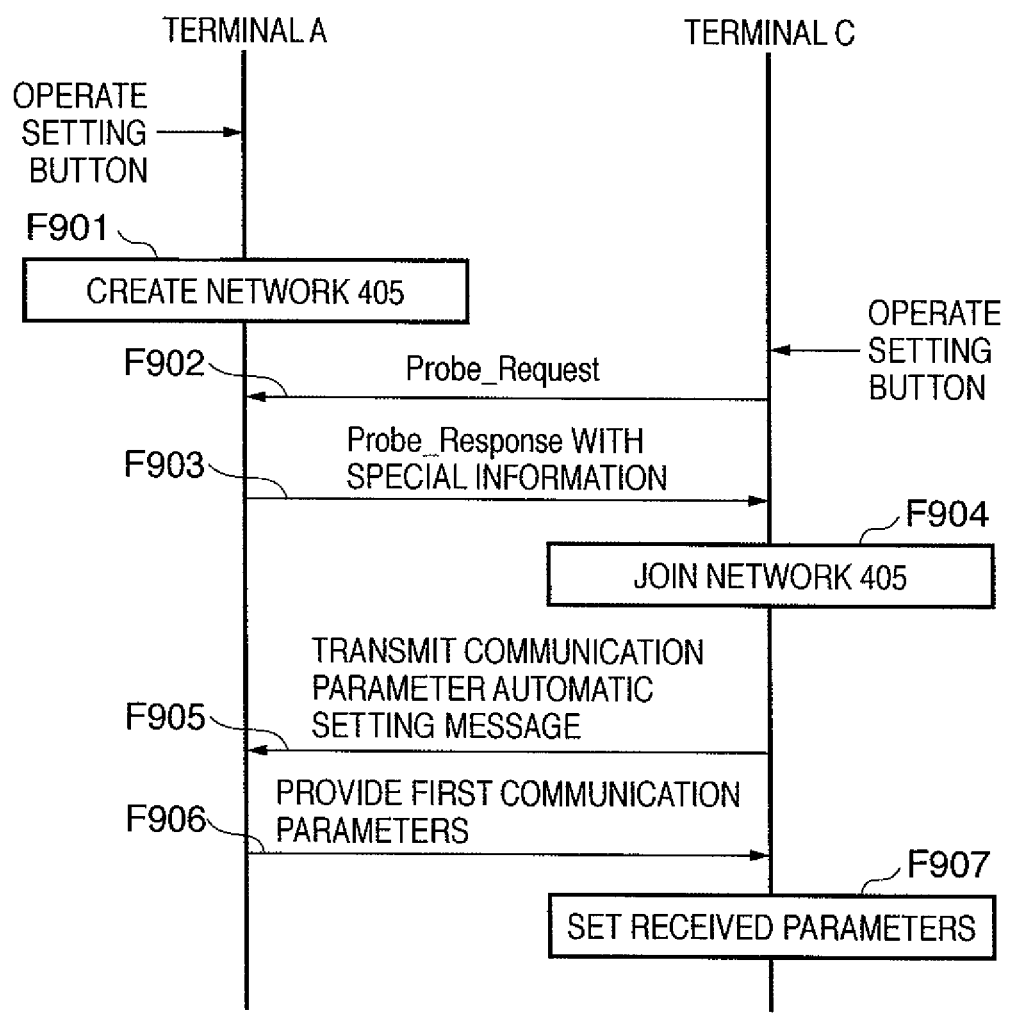

COMMUNICATION PARAMETER SETTING APPARATUS AND CONTROL METHOD THEREFORE

This application claims the benefit of Japanese Patent Application No. 2008-005811, filed Jan. 15, 2008, which is hereby incorporated by reference herein in its entirety.

TECHNICAL FIELD

The present invention relates to a communication apparatus and a control method therefor.

BACKGROUND ART

In wireless communication represented by a wireless LAN complying with the IEEE802.11 standard series, there are many setting items to be set in advance.

The setting items include communication parameters necessary for wireless communication, such as an SSID (Service Set IDentifier) as a network identifier, an encryption method, an encryption key, an authentication method, and an authentication key. It is very troublesome for a user to set them by manual input.

Various manufacturers have proposed automatic setting schemes for easily setting communication parameters in a wireless apparatus. In those automatic setting schemes, one apparatus provides another apparatus with communication parameters using a procedure predetermined between these connected apparatuses and a message, thereby automatically setting the communication parameters.

The WPS (Wi-Fi CERTIFIED(TM) for Wi-Fi Protected Setup: Easing the User Experience for Home and Small Office Wi-Fi(R) Networks, http://www.wi-fi.org/wp/wifi-protected-setup) standard has disclosed a communication parameter automatic setting scheme.

Communication parameter automatic setting schemes include a scheme (to be referred to as an authentication code scheme hereinafter) in which the user inputs an authentication code to an apparatus, and a scheme (to be referred to as a non-authentication code scheme hereinafter) in which the user does not input an authentication code.

In the authentication code scheme, apparatuses share an authentication code, and execute authentication processing between them. When the authentication processing between two apparatuses succeeds, these apparatuses perform setting processing. In this case, the authentication processing allows the apparatuses to securely transfer communication parameters.

In the non-authentication code scheme, upon detecting a terminal which has started communication parameter automatic setting, communication parameters are automatically provided to the terminal. As an example of the non-authentication code scheme, there is a scheme of starting setting processing by pressing the setting start button of an apparatus, and executing, during the setting processing, automatic setting with another apparatus which has started setting processing in the same manner. Since an unintended apparatus may be provided with communication parameters in the non-authentication code scheme, the security level of this scheme is lower than that of the authentication code scheme. However, the user need not input an authentication code, thus simplifying the operation.

As described above, in the authentication code scheme, it is possible to transfer communication parameters more securely than in the non-authentication code scheme. It is therefore desirable to be able to provide different communication parameters in accordance with a communication parameter automatic setting scheme to be used.

Conventional communication parameter automatic setting schemes, however, has no mechanism for automatically providing different communication parameters in accordance with a setting scheme.

Therefore, when communication parameters are to be selectively provided in conventional communication parameter automatic setting, the user needs to manually select communication parameters to be provided every time, thereby impairing convenience.

DISCLOSURE OF INVENTION

According to one aspect of the present invention, a communication apparatus comprises: storage means for storing communication parameters; identification means for identifying a communication parameter setting scheme used to provide a partner apparatus with communication parameters; selection means for selecting, from the communication parameters stored in the storage means, communication parameters in accordance with the setting scheme identified by the identification means; and providing means for providing the partner apparatus with the communication parameters selected by the selection means.

According to another aspect of the present invention, a control method for a communication apparatus, comprises: identifying a communication parameter setting scheme used to provide a partner apparatus with communication parameters; selecting communication parameters in accordance with the identified setting scheme; and providing the partner apparatus with the selected communication parameters.

According to the present invention, it is possible to automatically and selectively provide communication parameters in accordance with a communication parameter automatic setting scheme, thereby improving convenience.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 9 is a sequence chart showing the operation of terminal A and terminal C according to the embodiment.

BEST MODE FOR CARRYING OUT THE INVENTION

First Embodiment

A communication apparatus according to the present invention will be described in detail below with reference to the accompanying drawings. Although a case in which a wireless LAN system complying with the IEEE802.11 standard series is used will be explained blow, a communication method to be used is not necessarily limited to a wireless LAN.

A hardware configuration in the preferred embodiment will be described.

Figure 1:
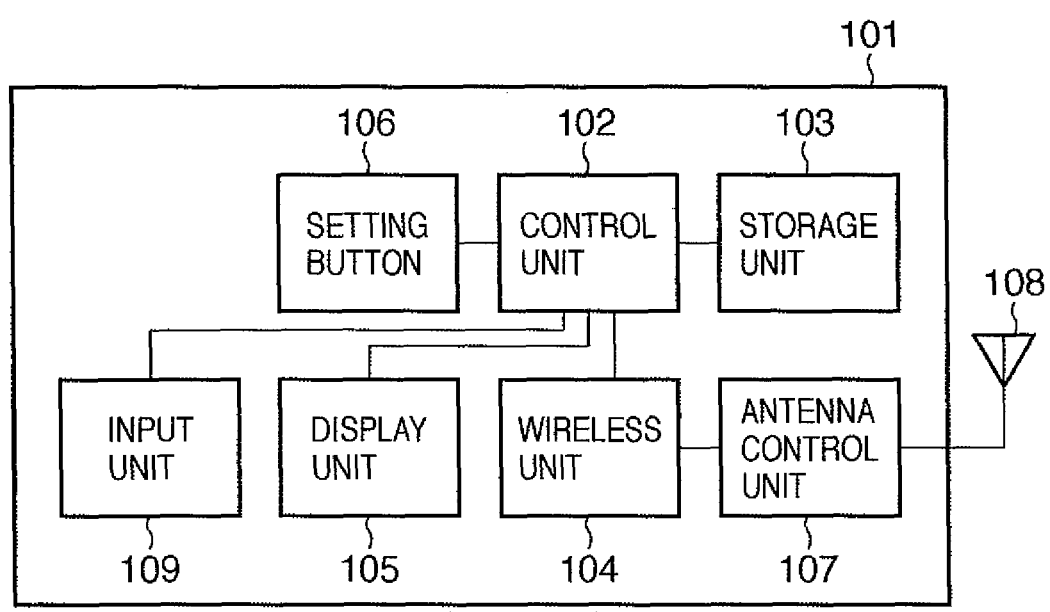
FIG. 1 is a block diagram showing a block configuration within a terminal.

FIG. 1 is a block diagram showing a configuration of each terminal (to be described later) according to this embodiment. Reference numeral 101 denotes a terminal as a whole; and 102, a control unit which controls the terminal as a whole by executing control programs stored in a storage unit 103. The control unit 102 also controls communication parameter setting with another terminal. The storage unit 103 stores the control programs executed by the control unit 102 and various pieces of information such as communication parameters. Various operations (to be described later) are performed when the control unit 102 executes the control programs stored in the storage unit 103. Reference numeral 104 denotes a wireless unit for wireless communication; 105, a display unit which provides various displays and has a function capable of outputting visually perceivable information like an LCD (Liquid Crystal Display) or LED (Light Emitting Diode), or a function capable of outputting a sound like a loudspeaker; and 106, a setting button which triggers a start of communication parameter setting. The control unit 102 starts a communication parameter setting operation (to be described later) by detecting a user operation of the setting button 106. Reference numeral 107 denotes an antenna control unit; 108, an antenna; and 109, an input unit which inputs an authentication code to be used in the communication parameter setting operation (to be described later). The storage unit 103 stores the input authentication code.

Figure 2:
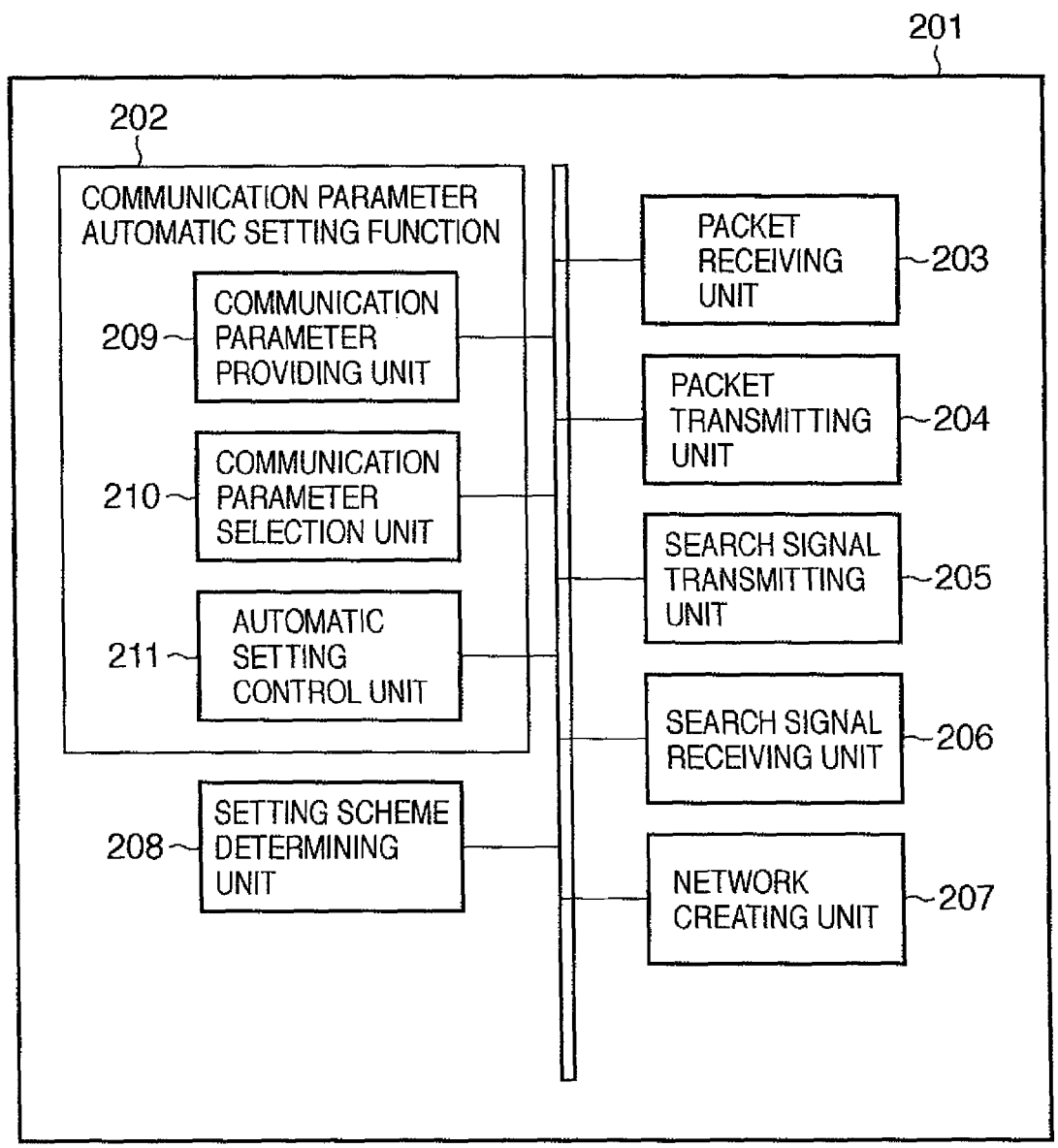
FIG. 2 is a block diagram showing functional blocks within a parameter providing terminal according to an embodiment of the present invention.

FIG. 2 is a block diagram showing a configuration of software functional blocks executed by a terminal according to this embodiment, which provides communication parameters in the communication parameter setting operation (to be described later).

Reference numeral 201 denotes a terminal as a whole; and 202, a communication parameter automatic setting functional block. In this embodiment, communication parameters necessary for wireless communication, such as an SSID as a network identifier, an encryption method, an encryption key, an authentication method, and an authentication key are automatically set. In this embodiment, there are two communication parameter automatic setting schemes, that is, an authentication code scheme and a non-authentication code scheme. Reference numeral 203 denotes a packet receiving unit which receives packets associated with various communications; 204, a packet transmitting unit which transmits packets associated with various communications; and 205, a search signal transmitting unit which controls transmission of apparatus search signals such as a Probe_Request signal. Note that the Probe_Request signal can also be referred to as a network search signal for searching for a desired network. The search signal transmitting unit 205 executes transmission processing of a Probe_Request signal (to be described later). The search signal transmitting unit 205 also performs transmission processing of a Probe_Response signal as a response signal to a received Probe_Request signal.

Reference numeral 206 denotes a search signal receiving unit which controls reception of apparatus search signals such as a Probe_Request signal from another terminal. The search signal receiving unit 206 executes reception processing of a Probe_Request signal (to be described later). The search signal receiving unit 206 also performs reception processing of a Probe_Response signal. Note that various pieces of information (self-information) on an apparatus that transmits an apparatus search signal are added to the apparatus search signal.

Reference numeral 207 denotes a network creating unit which creates a network. The network creating unit 207 creates a wireless LAN ad-hoc network in the wireless parameter setting operation (to be described later).

Reference numeral 208 denotes a setting scheme determining unit which determines a setting scheme to use in the communication parameter automatic setting process. The setting scheme determining unit 208 determines whether the storage unit 103 stores an authentication code input by the user through the input unit 109. If the storage unit 103 stores the authentication code, the setting scheme determining unit 208 determines to use the authentication code scheme; otherwise, the unit 208 determines to use the non-authentication code scheme.

In the communication parameter automatic setting functional block 202, reference numeral 209 denotes a communication parameter providing unit which provides a partner apparatus with communication parameters; and 210, a communication parameter selection unit which selects communication parameters to be provided to the partner apparatus on the basis of the communication parameter automatic setting scheme determined by the setting scheme determining unit 208. Reference numeral 211 denotes an automatic setting control unit which controls various Protocols in communication parameter automatic setting. The communication parameter providing unit 209, and the communication parameter selection unit 210 execute a communication parameter automatic setting process (to be described later) under the control of the automatic setting control unit 211.

Figure 3:
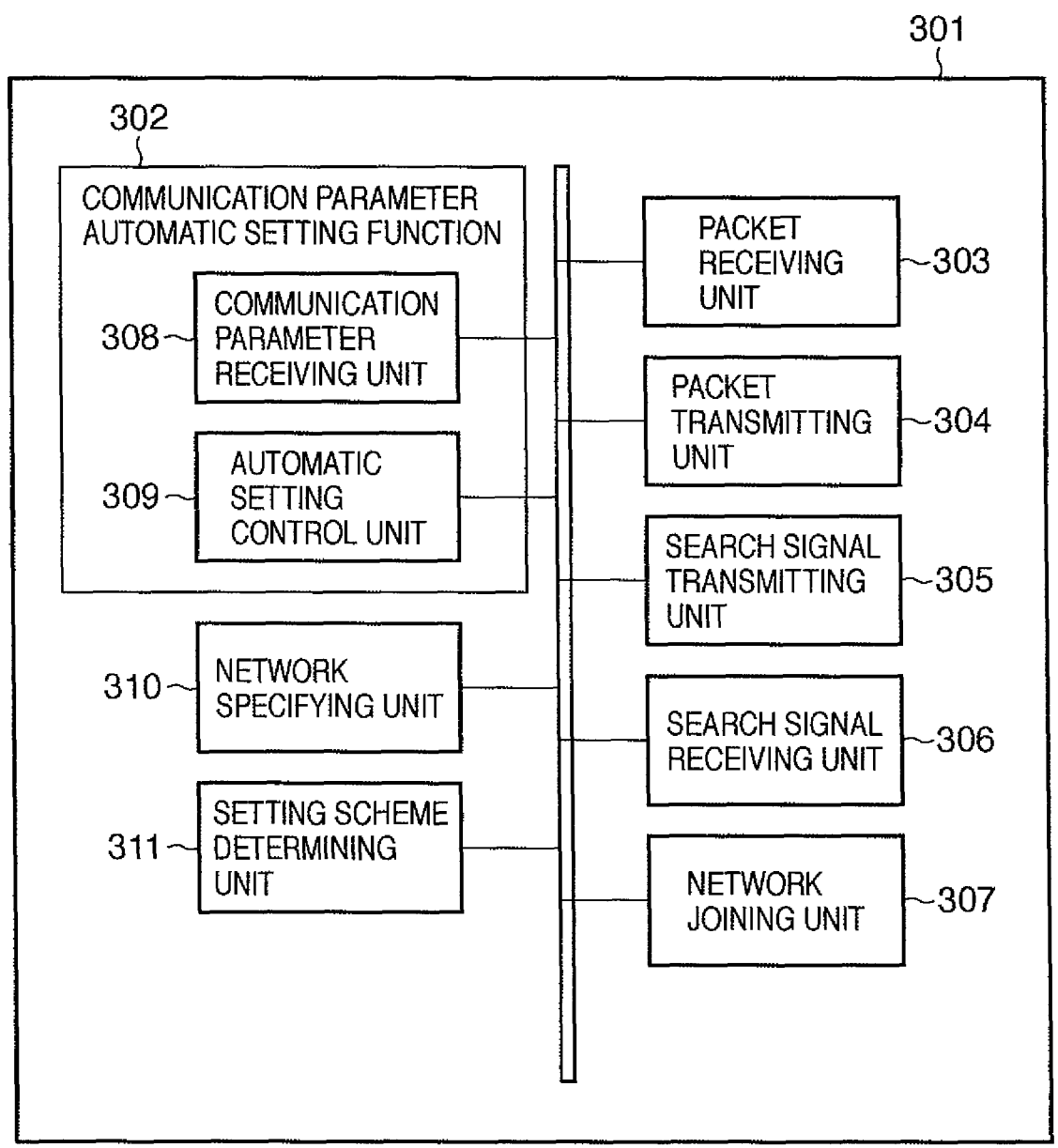
FIG. 3 is a block diagram showing functional blocks within a parameter receiving terminal according to the embodiment of the present invention.

FIG. 3 is a block diagram showing a configuration of software function blocks executed by a terminal according to this embodiment, which receives communication parameters in the communication parameter setting operation (to be described later).

Reference numeral 301 denotes a terminal as a whole; and 302, a communication parameter automatic setting functional block. In this embodiment, communication parameters necessary for wireless communication, such as an SSID as a network identifier, an encryption method, an encryption key, an authentication method, and an authentication key are automatically set. In this embodiment, there are two communication parameter automatic setting schemes, that is, the authentication code scheme and the non-authentication code scheme. Reference numeral 303 denotes a packet receiving unit which receives packets associated with various communications; 304, a packet transmitting unit which transmits packets associated with various communications; and 305, a search signal transmitting unit which controls transmission of apparatus search signals such as a Probe_Request signal. Note that the Probe_Request signal can also be referred to as a network search signal for searching for a desired network. The search signal transmitting unit 305 executes transmission processing of a Probe_Request signal (to be described later). The search signal transmitting unit 305 also performs transmission processing of a Probe_Response signal as a response signal to a received Probe_Request signal.

Reference numeral 306 denotes a search signal receiving unit which controls reception of apparatus search signals such as a Probe_Request signal from another terminal. The search signal receiving unit 306 executes reception processing of a Probe_Request signal (to be described later). The search signal receiving unit 306 also performs reception processing of a Probe_Response signal.

Reference numeral 307 denotes a network joining unit for joining a network. The network joining unit 307 executes a network joining process (to be described later).

In the communication parameter automatic setting functional block 302, reference numeral 308 denotes a communication parameter receiving unit which receives communication parameters transmitted from a communication parameter provider.

Reference numeral 309 denotes an automatic setting control unit which controls various protocols in communication parameter automatic setting. The communication parameter receiving unit 308 executes a communication parameter automatic setting process (to be described later) under the control of the automatic setting control unit 309.

Reference numeral 310 is a network specifying unit which specifies, in the communication parameter automatic setting process, a network which a communication parameter provider joins. The network specifying unit 310 executes a network specifying process (to be described later).

Reference numeral 311 is a setting scheme determining unit which determines a setting scheme to be used in the communication parameter automatic setting process. The setting scheme determining unit 311 determines whether the storage unit 103 stores an authentication code input from the input unit 109. If the storage unit 103 stores the authentication code, the setting scheme determining unit 311 determines to use the authentication code scheme; otherwise, the unit 311 determines to use the non-authentication code scheme.

Note that all the software functional blocks are correlated with each other in a software or hardware manner. The above functional blocks are merely examples. A plurality of functional blocks may constitute one functional block, or any one of the functional blocks may be divided into a plurality of blocks each executing a function.

Figure 4:
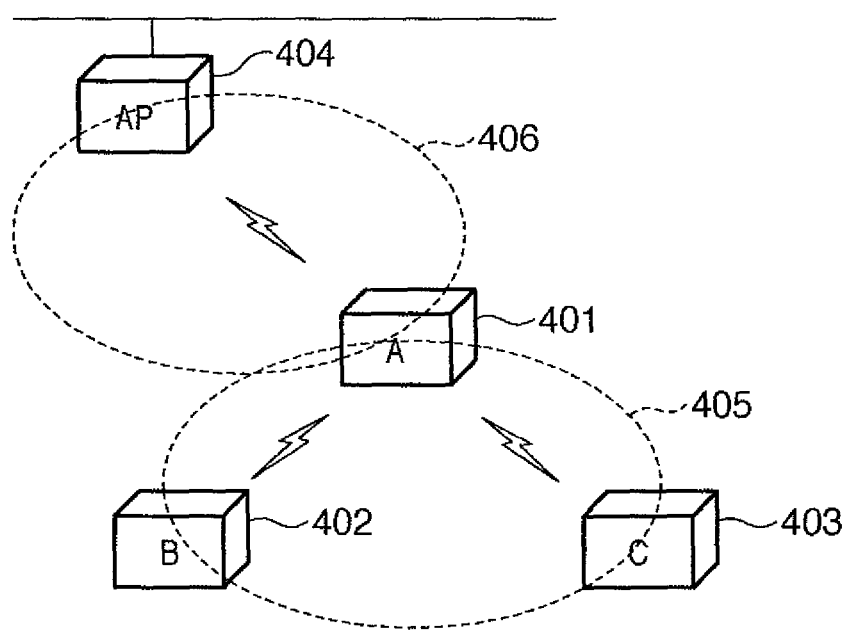
FIG. 4 is a view collectively showing a configuration in the embodiment.

FIG. 4 is a view showing a terminal A 401 (to be referred to as terminal A hereinafter), a terminal B 402 (to be referred to as terminal B hereinafter), a terminal C 403 (to be referred to as terminal C hereinafter), and an access point 404. FIG. 4 also shows a wireless LAN ad-hoc network 405 created by terminal A. Furthermore, FIG. 4 shows a wireless LAN infrastructure network 406 created by the access point 404.

Terminal A, terminal B, and terminal C have a IEEE802.11 wireless LAN communication function, and wirelessly communicate with each other by wireless LAN ad hoc communication. Terminal A has the configuration shown in FIGS. 1 and 2 described above. Each of terminal B and terminal C has the configuration shown in FIGS. 1 and 3.

Each terminal can wirelessly communicate with the access point by switching a communication mode to an infrastructure communication mode.

The storage unit 103 of terminal A stores, in advance, the first communication parameters for data communication on the network 405. The storage unit 103 of terminal A also stores, in advance, the second communication parameters necessary for joining the network 406.

Terminal A is a communication parameter provider, and provides terminal B and terminal C with communication parameters. In this case, terminal B and terminal C are communication parameter acceptors.

Consider a case in which terminal C performs communication parameter automatic setting by the non-authentication code scheme with terminal A, and executes data communication on the network 405 created by terminal A. Consider also a case in which terminal B performs communication parameter automatic setting by the authentication code scheme with terminal A, and joins the network 406 created by the access point 404.

Figure 5:
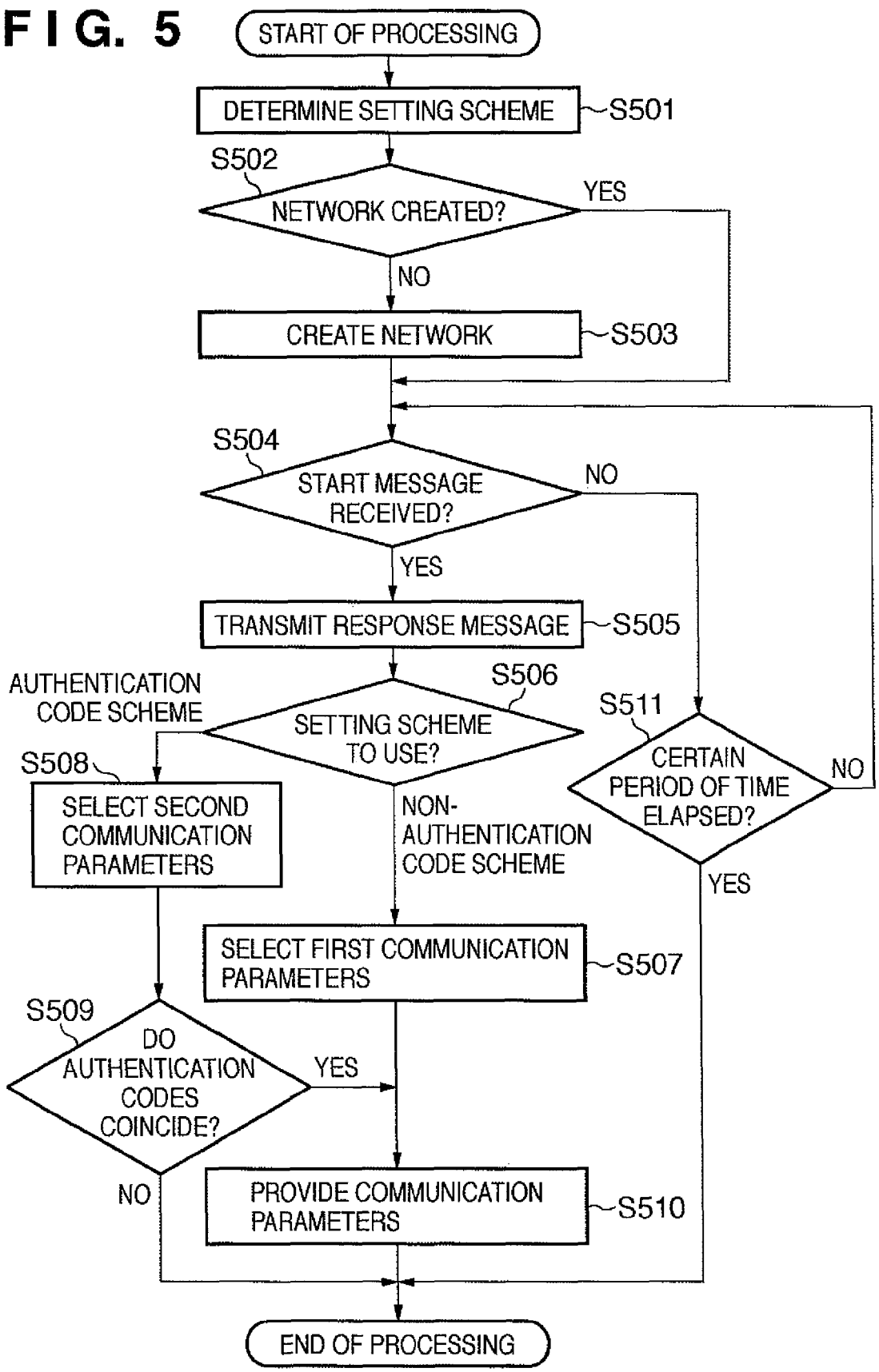
FIG. 5 is a flowchart showing the operation of a communication parameter provider according to the embodiment.

FIG. 5 is an operation flowchart for explaining processing when terminal A provides communication parameters by executing a communication parameter automatic setting process. In the following explanation, assume that an apparatus which receives communication parameters is an acceptor (receiving apparatus). When the user operates the setting button of terminal A, the processing shown in FIG. 5 starts.

Once the processing starts, the setting scheme determining unit 208 of terminal A checks the storage unit 103, and determines a communication parameter automatic setting scheme to use (S501).

The network creating unit 207 of terminal A determines whether the network 405 for ad-hoc communication has been created. If the network 405 is not created, the unit 207 creates the network (S502 and S503).

After the network is created, when the search signal receiving unit 206 of terminal A receives a Probe_Request signal, the search signal transmitting unit 205 returns a Probe_Response signal which contains additional information representing communication parameter automatic setting.

After that, the automatic setting control unit 211 of terminal A waits for a start message of communication parameter automatic setting to be transmitted from an acceptor for a certain period of time (S504). If the unit 211 receives no start message until a certain period of time elapses, the processing ends (S511).

If terminal A receives a start message of communication parameter automatic setting, the automatic setting control unit 211 returns a response message to the acceptor, and starts a process of providing the acceptor with communication parameters (S505). The automatic setting control unit 211 causes the communication parameter selection unit 210 to select, based on the setting scheme determined in step S501, parameters to be provided to the acceptor. If the non-authentication code scheme is used, the automatic setting control unit 211 selects the first communication parameters as communication parameters to be provided to the acceptor (S506 and S507). If the authentication code scheme is used, the automatic setting control unit 211 selects the second communication parameters as communication parameters to be provided to the acceptor (S506 and S508).

If the non-authentication code scheme is used, the automatic setting control unit 211 causes the communication parameter providing unit 209 to provide the acceptor with the first communication parameters by the non-authentication code scheme (S510), and ends the processing.

If the authentication code scheme is used, the automatic setting control unit 211 exchanges messages with the acceptor, and determines whether an authentication code input to the acceptor coincides with that input to the self-terminal (S509). If the codes coincide with each other as a result of the determination, the automatic setting control unit 211 provides the acceptor with the second communication parameters by the authentication code scheme (S510), and ends the processing; otherwise, the automatic setting control unit 211 ends the processing without providing communication parameters.

Note that if the authentication code input from the input unit 109 is stored in the storage unit 103, the automatic setting control unit 211 deletes the authentication code after providing the communication parameters.

In the above explanation, if terminal A uses the non-authentication code scheme, the first communication parameters are selected. If terminal A uses the authentication code scheme, the second communication parameters are selected. The reason why the first communication parameters are selected in the case of the non-authentication code scheme is to prohibit a wired network connected with the access point 404 from being accessed. This is because the security level of the non-authentication code scheme is lower than that of the authentication code scheme (the non-authentication code scheme is less secure). On the other hand, in the case of the authentication code scheme, since the security level is higher (the authentication code scheme is more secure), the wired network connected with the access point 404 is allowed to be accessed. However, as for the communication parameters to be provided, the above explanation may be reversed. That is, if the non-authentication code scheme is used, the second communication parameters may be selected. If the authentication code scheme is used, the first communication parameters may be selected. In this case, since only a terminal which has input a predetermined authentication code can execute communication on the network 405, it is possible to use the network 405 as a network which can be used by only the user who knows the authentication code.

Figure 6:
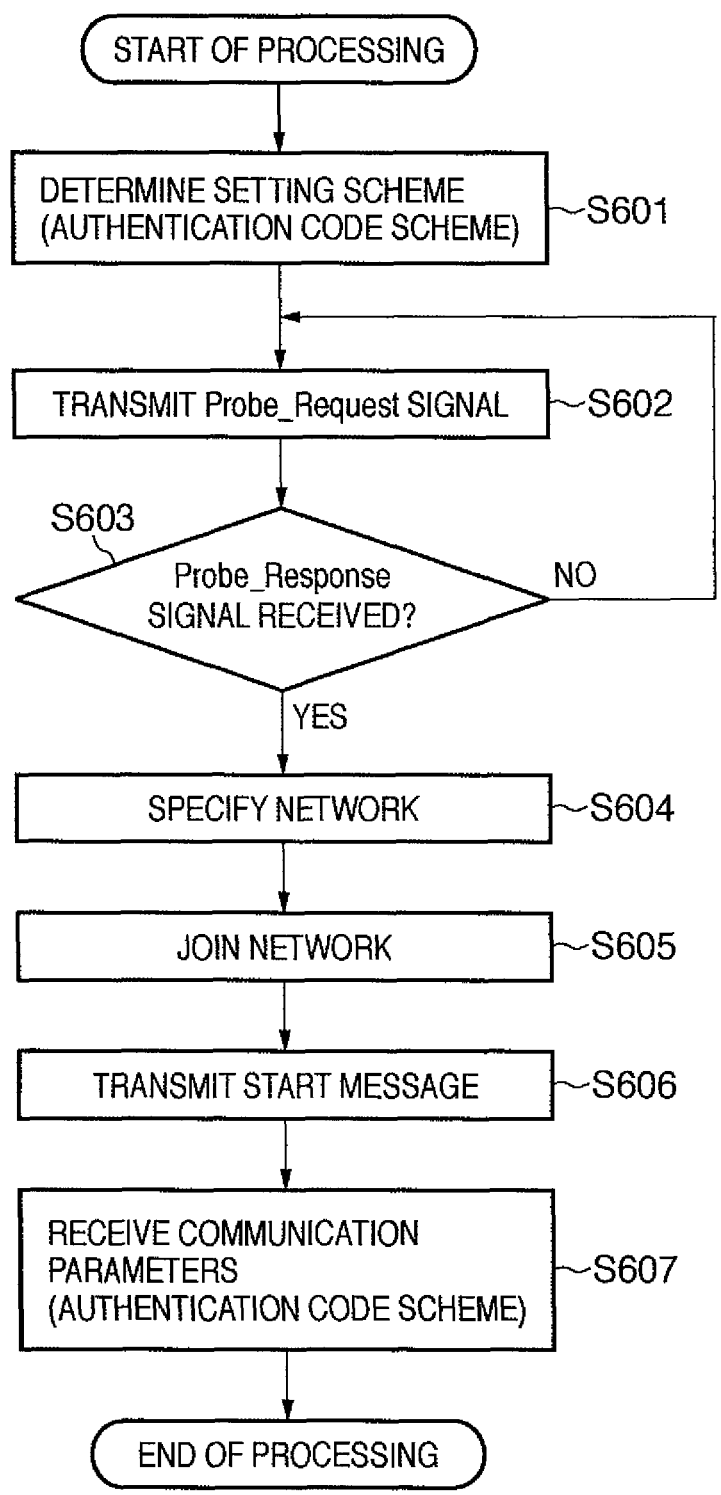
FIG. 6 is a flowchart showing the operation of the authentication code scheme of a communication parameter acceptor according to the embodiment.

FIG. 6 is an operation flowchart for explaining processing when terminal B receives communication parameters by executing a communication parameter automatic setting process. When the user inputs an authentication code in terminal B, and then operates the setting button, the processing shown in FIG. 6 starts.

After the processing starts, the setting scheme determining unit 311 of terminal B checks the storage unit 103, and determines to use the authentication code scheme (S601).

After the determination, the search signal transmitting unit 305 of terminal B transmits a Probe_Request signal (S602).

Then, the search signal receiving unit 306 of terminal B waits for a Probe_Response signal, which contains additional information representing communication parameter automatic setting, to be transmitted from the provider (S603). If no Probe_Response signal which contains additional information representing communication parameter automatic setting is transmitted until a certain period of time elapses, terminal B repeats transmission of a Probe_Request signal.

If the unit 306 receives a Probe_Response signal, the network specifying unit 310 of terminal B specifies, based on information contained in the Probe_Response signal, the network identifier of the network created by the provider (S604).

Upon specifying the network identifier, the network joining unit 307 of terminal B joins the network created by the provider (S605). In this case, terminal B sets the network identifier specified in step S604, and joins the network created by the provider. It is therefore possible to communicate for communication parameter automatic setting. Since an encryption method and an encryption key are not set, however, it is impossible to communicate data on the network.

After joining the network, the automatic setting control unit 309 of terminal B causes the communication parameter receiving unit 308 to transmit a start message of communication parameter automatic setting, and starts a process of receiving communication parameters from the provider (S606).

After the process starts, The communication parameter receiving unit 308 receives communication parameters from the provider by the authentication code scheme using the authentication code which has been input in advance (S607). Note that after receiving the communication parameters, the automatic setting control unit 309 deletes the authentication code, which has been input from the input unit 109, stored in the storage unit 103.

Figure 7:
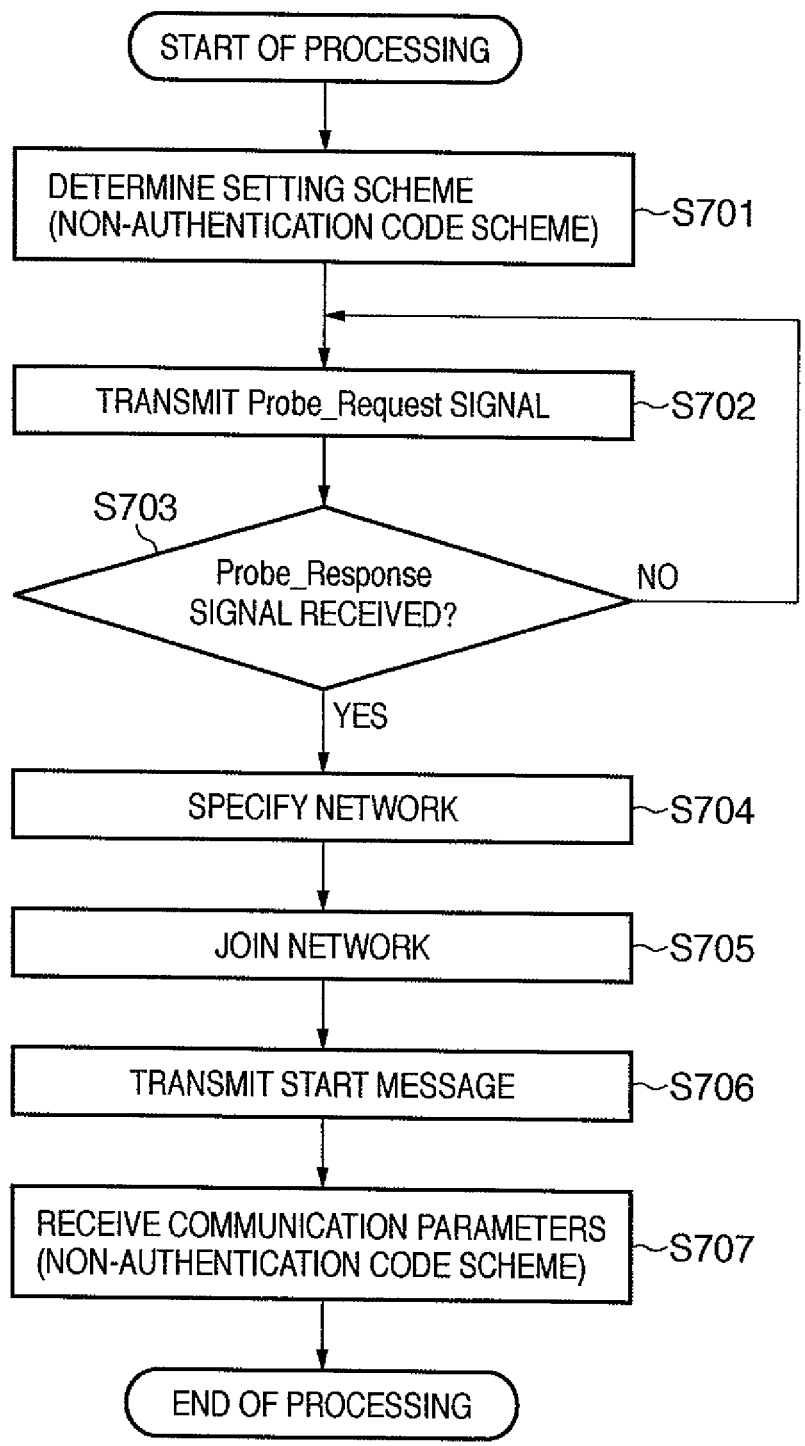
FIG. 7 is a flowchart showing the operation of the non-authentication code scheme of a communication parameter acceptor according to the embodiment.

FIG. 7 is an operation flowchart for explaining processing when terminal C receives communication parameters by executing a communication parameter automatic setting process. Note that when the user operates the setting button of terminal C, the processing shown in FIG. 7 starts.

After the processing starts, the setting scheme determining unit 311 of terminal C checks the storage unit 103, and determines to use the non-authentication code scheme (S701).

After the determination, the search signal transmitting unit 305 of terminal C transmits a Probe_Request signal (S702).

Then, the search signal receiving unit 306 of terminal C waits for a Probe_Response signal, which contains additional information representing communication parameter automatic setting, to be transmitted from the provider (S703). If no Probe_Response signal which contains additional information representing communication parameter automatic setting is transmitted until a certain period of time elapses, terminal C repeats transmission of a Probe_Request signal.

If the unit 306 receives a Probe_Response signal, the network specifying unit 310 of terminal C specifies, based on information contained in the Probe_Response signal, the network identifier of the network created by the provider (S704).

Upon specifying the network identifier, the network joining unit 307 of terminal C joins the network created by the provider (S705). In this case, terminal C sets the network identifier specified in step S704, and joins the network created by the provider. It is therefore possible to communicate for communication parameter automatic setting. Since an encryption method and an encryption key are not set, however, it is impossible to communicate data on the network.

After joining the network, the automatic setting control unit 309 of terminal C causes the communication parameter receiving unit 308 to transmit a start message of communication parameter automatic setting, and starts a process of receiving communication parameters from the provider (S706).

After the process starts, the communication parameter receiving unit 308 receives communication parameters from the provider by the non-authentication code scheme (S707).

Figure 8:
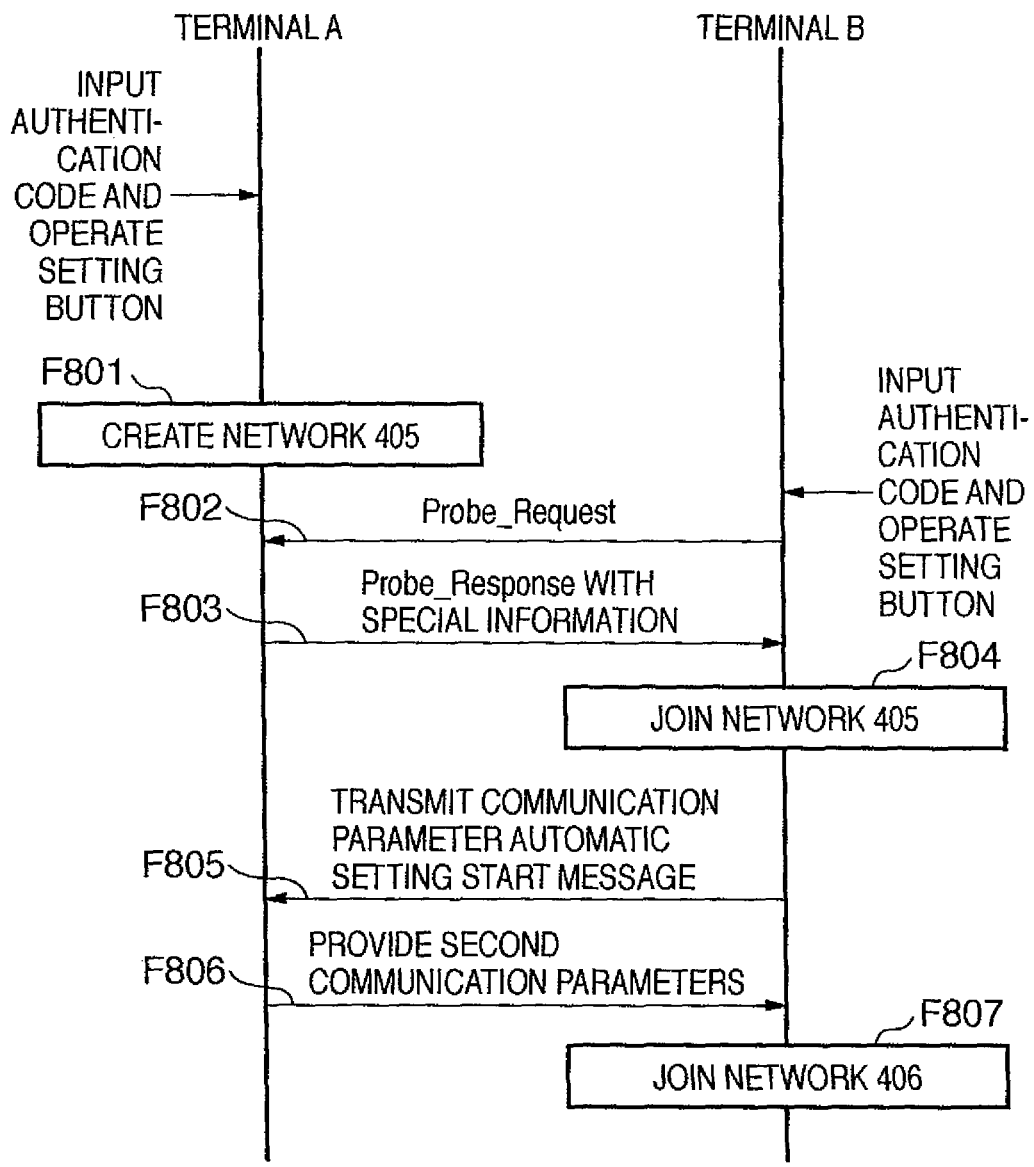
FIG. 8 is a sequence chart showing the operation of terminal A and terminal B according to the embodiment.

FIG. 8 is a sequence chart showing processing when terminal B receives the communication parameters of the network 406 from terminal A, and joins the network 406. In FIG. 8, assume that the processing starts in a state in which terminal A does not create the network 405.

When the user inputs an authentication code to terminal A, and then operates the setting button, terminal A starts the processing of FIG. 5. Upon start of the processing, terminal A determines to use the authentication code scheme, and creates the network 405 (F801).

When the user inputs, to terminal B, the same authentication code as that stored in terminal A, and then operates the setting button, terminal B starts the processing of FIG. 6. After that, terminal B determines to use the authentication code scheme, transmits a Probe_Request signal (F802), and searches for a provider.

Terminal A which has received the Probe_Request signal transmitted in F802 returns, to terminal B, a Probe_Response signal to which an identifier representing that terminal A has a communication parameter automatic setting function is added (F803).

Terminal B which has received the Probe_Response signal to which the identifier representing that terminal A has the communication parameter automatic setting function is added detects and specifies the network 405 created by terminal A, and then joins the network (F804). After joining the network, terminal B transmits a start message of communication parameter automatic setting (F805).

On the network 405, upon receiving the start message of communication parameter automatic setting from terminal B, terminal A provides terminal B with the second communication parameters by the authentication code scheme (F806).

After receiving the communication parameters, terminal B joins the network 406 using the received second communication parameters, and ends the processing (F807).

FIG. 9 is a sequence chart showing processing when terminal C receives the communication parameters of the network 405 from terminal A, and joins the network 405. In FIG. 9, assume that the processing starts in a state in which terminal A does not create the network 405.

When the user operates the setting button of terminal A, terminal A starts the processing of FIG. 5. Upon start of the processing, terminal A determines to use the non-authentication code scheme, and creates the network 405 (F901).

When the user operates the setting button of terminal C, terminal C starts the processing of FIG. 7. Terminal C then determines to use the non-authentication code scheme, transmits a Probe_Request signal (F902), and searches for a provider.

Terminal A which has received the Probe_Request signal transmitted in F902 returns, to terminal C, a Probe_Response signal to which an identifier representing that terminal A has a communication parameter automatic setting function is added (F903).

Terminal C which has received the Probe_Response signal to which the identifier representing that terminal A has the communication parameter automatic setting function is added detects and specifies the network 405 created by terminal A, and then joins the network (F904).

After joining the network, terminal C transmits a start message of communication parameter automatic setting (F905).

On the network 405, upon receiving the start message of communication parameter automatic setting from terminal C, terminal A provides terminal C with the first communication parameters by the non-authentication code scheme (F906).

After receiving the communication parameters, terminal C sets the received first communication parameters in itself, and enters a state in which it is possible to communicate data with terminal A (F907).

Note that although a case in which the first communication parameters are used for the ad-hoc network and the second communication parameters are used for the infrastructure network has been explained, both of the first and second parameters may be used for the infrastructure or ad-hoc network. Although the authentication code scheme and non-authentication code scheme have been described as examples of the setting scheme to be identified, the present invention is not limited to them. For example, by operating the input unit 109, one of various setting schemes provided by various manufacturers may be identified and communication parameters may be selected and provided in accordance with the identified setting scheme.

As described above, when providing an acceptor with communication parameters, a provider automatically selects, based on a communication parameter automatic setting scheme to use, communication parameters to be provided. This allows the provider to easily and quickly select the communication parameters suitable for the acceptor. It is therefore possible to efficiently and easily execute communication parameter automatic setting for providing and receiving the communication parameters.

Although the preferred embodiments of the present invention have been described above, they are merely examples for explaining the present invention, and are not intended to limit the scope of the present invention. Various modifications can be made to the embodiments without departing from the spirit and scope of the present invention.

For example, in the above explanation of the embodiments, Probe_Request and Probe_Response signals are used. However, signals to be transmitted are not limited to them, and other signals playing the same roles may be used.

An IEEE802.11 wireless LAN has been explained as an example. The present invention may, however, be implemented in another wireless medium such as wireless USB, MBOA, Bluetooth®, UWB (Ultra Wide Band), or ZigBee. The present invention may also be implemented in a wired communication medium such as a wired LAN.

Note that MBOA is an abbreviation for Multi Band OFDM Alliance. UWB includes wireless USB, wireless 1394, and WINET.

Although a network identifier, encryption method, encryption key, authentication method, and authentication key are used as examples of communication parameters, another information may be used and also included in communication parameters.

In the present invention, a storage medium which stores software program codes for implementing the above-described functions may be supplied to a system or apparatus, and the computer (or the CPU or MPU) of the system or apparatus may read out and execute the program codes stored in the storage medium. In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, ROM, and DVD.

The above-described functions are implemented when the computer executes the readout program codes. Also, the above-described functions may be implemented when an OS running on the computer performs some or all of actual processes on the basis of the instructions of the program codes. OS is an abbreviation for an Operating System.

Furthermore, the above-described functions may be implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-005811, filed Jan. 15, 2008, which is hereby incorporated by reference herein in its entirety.

The invention claimed is:

1. A communication apparatus comprising:
   a storage unit configured to store first communication parameters to wirelessly communicate in a first wireless network complying with an IEEE802.11 standard and second communication parameters to wirelessly communicate in a second wireless network complying with an IEEE802.11 standard, wherein the first communication parameters include a first wireless network identifier, a first encryption method, and a first encryption key, and the second communication parameters include a second wireless network identifier, a second encryption method, and a second encryption key;
   a determination unit configured to determine whether a communication parameter setting scheme used to provide a partner apparatus with communication parameters is either an authentication code scheme requiring an authentication code input to the communication apparatus by a user or a non-authentication code scheme not requiring the authentication code input by the user but requiring a pushing of both a first predetermined button on the communication apparatus and a second predetermined button on the partner apparatus by the user;
   a selection unit configured to select, from the communication parameters stored in the storage unit, any one of the first communication parameters and the second communication parameters in accordance with the setting scheme determined by the determination unit; and
   a providing unit configured to provide the partner apparatus with the communication parameters selected by the selection unit.

2. The apparatus according to claim 1, wherein the selection unit selects the first communication parameters when the authentication code scheme is determined by the determination unit, and selects the second communication parameters when the non-authentication code scheme is determined by the determination unit.

3. The apparatus according to claim 1, wherein the selection unit selects the first communication parameters when the non-authentication code scheme is determined by the determination unit, and selects the second communication parameters when the authentication code scheme is determined by the determination unit.

4. The apparatus according to claim 1, wherein the first wireless network is an ad hoc network and the second wireless network is an infrastructure network.

5. The apparatus according to claim 1, wherein the first wireless network is created by the communication apparatus and the second wireless network is created by an access point.

6. The apparatus according to claim 1, wherein the communication apparatus and the partner apparatus communicate directly in the first network, and the communication apparatus and the partner apparatus communicate via an access point in the second network.

7. A control method for a communication apparatus, comprising:
   determining whether a communication parameter setting scheme used to provide a partner apparatus with communication parameters is either an authentication code scheme requiring an authentication code input to the communication apparatus by a user or a non-authentication code scheme not requiring the authentication code input by the user but requiring a pushing of both a first predetermined button by the user on the communication apparatus and a second predetermined button on the partner apparatus;
   selecting any one of first communication parameters to wirelessly communicate in a first wireless network complying with an IEEE802.11 standard and second communication parameters to wireles sly communicate in a second wireless network complying with an IEEE802.11 standard in accordance with the determined setting scheme, wherein the first communication parameters include a first wireless network identifier, a first encryption method, and a first encryption key, and the second communication parameters include a second wireless network identifier, a second encryption method and a second encryption key; and
   providing the partner apparatus with the selected communication parameters.

8. A non-transitory computer-readable storage medium storing a computer program for causing a communication apparatus to execute the control method according to claim 7.

* * * * *